United States Patent
Foschini

(10) Patent No.: US 7,983,710 B2
(45) Date of Patent: Jul. 19, 2011

(54) METHOD OF COORDINATED WIRELESS DOWNLINK TRANSMISSION

(75) Inventor: Gerard J. Foschini, South Amboy, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1081 days.

(21) Appl. No.: 11/809,354

(22) Filed: May 31, 2007

(65) Prior Publication Data

US 2008/0299981 A1 Dec. 4, 2008

(51) Int. Cl.
*H04B 7/00* (2006.01)

(52) U.S. Cl. ............... 455/524; 455/422.1; 455/403; 455/517

(58) Field of Classification Search ........... 455/422.1, 455/403, 524, 517, 3.01
See application file for complete search history.

(56) References Cited

U.S. PATENT DOCUMENTS

| | | | | |
|---|---|---|---|---|
| 6,034,649 | A | 3/2000 | Wilson | 343/795 |
| 6,377,631 | B1 | 4/2002 | Raleigh | 375/299 |
| 6,531,984 | B1 | 3/2003 | Johannisson | 343/700 |
| 6,940,917 | B2 | 9/2005 | Menon | 375/267 |
| 7,885,689 | B2 * | 2/2011 | Venkatesan | 455/562.1 |
| 2005/0123004 | A1 * | 6/2005 | Lechleider et al. | 370/529 |
| 2006/0146755 | A1 * | 7/2006 | Pan et al. | 370/334 |
| 2006/0262737 | A1 * | 11/2006 | Livet et al. | 370/254 |
| 2007/0223423 | A1 * | 9/2007 | Kim et al. | 370/334 |
| 2008/0260051 | A1 * | 10/2008 | Boccardi et al. | 375/259 |
| 2009/0016463 | A1 * | 1/2009 | Roh | 375/295 |

OTHER PUBLICATIONS

C. T. K. Ng & A. Goldsmith, *Transmitter Cooperation in Ad-Hoc Wireless Networks: Does Dirty-Paper Coding Beat Relaying?*, IEEE Information Theory Workshop, pp. 277-282, (Oct. 2004).
M. K. Karakayali & G. J. Foschini, et al., *Network Coordination for Spectrally Efficient Communications in Cellular Systems*, IEEE Wireless Communications, pp. 56-61, (Aug. 2006).
A. C. Koutalos, *Antenna Arrays for the Downlink of FDD Wideband CDMA Communication Systems*, A thesis submitted for the degree of Doctor of Philosophy, The University of Edinburgh, (Nov. 2002).
Taesang Yoo & A. Goldsmith, *On the optimality of multiantenna broadcast scheduling using zero-forcing beamforming*, IEEE Journal on Selected Areas in Communications, vol. 24, Issue 3, 528-541 (Mar. 2006).
Taesang Yoo & A. Goldsmith, *Optimality of zero-forcing beamforming with multiuser diversity*, 2005 IEEE International Conference on Communications, vol. 1, 542-546 (May 2005).
Taesang Yoo & A. Goldsmith, *Sum-rate optimal multi-antenna downlink beamforming strategy based on clique search*, IEEE Global Telecommunications Conference 2005, vol. 3 (Nov. 28-Dec. 2, 2005).

* cited by examiner

*Primary Examiner* — Huy Phan
(74) *Attorney, Agent, or Firm* — McCormick, Paulding & Huber LLP

(57) ABSTRACT

To reduce intercell interference, a method of coherently coordinated downlink transmission in a wireless network involves coordinating transmissions from a plurality of base stations to a plurality of wireless units, for coherent, reinforced reception of the transmitted signals at the wireless units. Thus, transmissions from the base stations are coordinated such that signals received at each wireless unit's particular location constructively add, but cancel out at other locations. The signals are generated based on a zero-forcing operation, e.g., by applying zero-forcing complex antenna weight vectors to data symbols designated for transmission to the wireless units. For fairness, the signals are transmitted at no less than a guaranteed common rate. A convex optimization problem (which incorporates a per-base station power constraint or a per-transmission antenna power constraint) is solved to maximize the guaranteed common rate. Dirty paper coding may also be employed.

20 Claims, 9 Drawing Sheets

$$\mathbf{x} = \sum_{j=1}^{r} b_{1j}\mathbf{w}_{1j} + \sum_{j=1}^{r} b_{2j}\mathbf{w}_{2j} + \cdots + \sum_{j=1}^{r} b_{Nj}\mathbf{w}_{Nj} \quad \text{(EQ. 2)}$$

$$\mathbf{w}_{ij} = [w_{ij}^1, w_{ij}^2, \ldots, w_{ij}^{tM}]^T \quad \text{(EQ. 3)}$$

$$\mathbf{H}_k w_{ij} = 0, \quad \|\mathbf{w}_{ij}\|^2 = 1, \quad \forall i \neq k, \quad j = 1, \ldots, r \quad \text{(EQ. 4)}$$

$$\mathbf{y}_k = \mathbf{H}_k \mathbf{x} + \mathbf{n}_k \quad \text{(EQ. 5)}$$

$$= \mathbf{H}_k \left( \sum_{j=1}^{r} b_{1j}\mathbf{w}_{1j} + \sum_{j=1}^{r} b_{2j}\mathbf{w}_{2j} + \cdots + \sum_{j=1}^{r} b_{Nj}\mathbf{w}_{Nj} \right) + \mathbf{n}_k \quad \text{(EQ. 6)}$$

$$= \mathbf{H}_k \left( \sum_{j=1}^{r} b_{kj}\mathbf{w}_{kj} \right) + \mathbf{n}_k \quad \text{(EQ. 7)}$$

FIG. 5

$$\mathbf{y}_k = \begin{bmatrix} y_{k1} \\ y_{k2} \\ \vdots \\ y_{kr} \end{bmatrix} = \begin{bmatrix} (\mathbf{h}_{k1}\mathbf{w}_{k1}) & (\mathbf{h}_{k1}\mathbf{w}_{k2}) & \ldots & (\mathbf{h}_{k1}\mathbf{w}_{kr}) \\ (\mathbf{h}_{k2}\mathbf{w}_{k1}) & (\mathbf{h}_{k2}\mathbf{w}_{k2}) & \ldots & (\mathbf{h}_{k2}\mathbf{w}_{kr}) \\ \vdots & \vdots & \vdots & \vdots \\ (\mathbf{h}_{kr}\mathbf{w}_{k1}) & (\mathbf{h}_{kr}\mathbf{w}_{k2}) & \ldots & (\mathbf{h}_{kr}\mathbf{w}_{kr}) \end{bmatrix} \begin{bmatrix} b_{k1} \\ b_{k2} \\ \vdots \\ b_{kr} \end{bmatrix} + \begin{bmatrix} n_{k1} \\ n_{k2} \\ \vdots \\ n_{kr} \end{bmatrix}$$

(EQ. 8)

$$\tilde{\mathbf{y}}_k = \mathbf{D}_k \tilde{\mathbf{b}}_k + \tilde{\mathbf{n}}_k \quad \text{(EQ. 11)}$$

WHERE $\begin{cases} \tilde{\mathbf{y}}_k = \mathbf{U}_k^\dagger \mathbf{y}_k \\ \tilde{\mathbf{b}}_k = \mathbf{V}_k^\dagger \mathbf{b}_k \\ \tilde{\mathbf{n}}_k = \mathbf{U}_k^\dagger \mathbf{n}_k \end{cases}$ $$\sum_{j=1}^{r} \log_2 \left(1 + \lambda_{kj} E[|\tilde{b}_{kj}|^2]\right) \quad \text{(EQ. 12)}$$

$$\tilde{\mathbf{b}}_k = \mathbf{V}_k^\dagger \mathbf{b}_k \quad \text{(EQ. 13)}$$

$$\mathbf{V}_k^\dagger = [v_{ij}]_{r \times r} \quad \text{(EQ. 14)}$$

$$E[|\tilde{b}_{kj}|^2] = |v_{j1}|^2 P_{k1} + |v_{j2}|^2 P_{k2} + \cdots + |v_{jr}|^2 P_{kr} = \sum_{n=1}^{r} |v_{jn}|^2 P_{kn}$$

$$\mathbf{w}_{kj} = [w_{kj}^1, w_{kj}^2, \ldots, w_{kj}^{tM}]^T \quad \text{(EQ. 16)}$$

Power
Contribution: $|w_{kj}^q|^2 P_{kj}$ \quad (EQ. 17)

$$P_q = \sum_{k=1}^{N} \sum_{j=1}^{r} |w_{kj}^q|^2 P_{kj} \quad \text{(EQ. 18)}$$

$$\max \; r_0 \quad \text{(EQ. 19a)}$$

$$s.t. \; \sum_{j=1}^{r} \log_2 \left(1 + \lambda_{kj} \sum_{n=1}^{r} |v_{jn}|^2 P_{kn}\right) \geq r_0, \; k = 1, \ldots, N \text{(EQ. 19b)}$$

$$\sum_{k=1}^{N} \sum_{j=1}^{r} |w_{kj}^q|^2 P_{kj} \leq P_{max}, \; q = 1, \ldots, tM \quad \text{(EQ. 19c)}$$

$$r_0 \in \Re^+, P_{kj} \in \Re^+ \quad \forall \; k, j \quad \text{(EQ. 19d)}$$

$$r_0 = \min_k \sum_{j=1}^{r} \log_2 \left(1 + \lambda_{kj} \sum_{n=1}^{r} |v_{jn}|^2 P_{kn}\right) \quad \text{(EQ. 20)}$$

FIG. 7

$$\mathbf{H}_{\pi(k)} \mathbf{w}_{\pi(i)j} = 0, \; \|\mathbf{w}_{\pi(i)j}\|^2 = 1, \; \forall k > i, \; j = 1, \ldots, r \quad \text{(EQ. 21)}$$

$$\begin{aligned}
\mathbf{y}_{\pi(i)} &= \mathbf{H}_{\pi(i)} \mathbf{x} + \mathbf{n}_{\pi(i)} \quad \text{(EQ. 21a)} \\
&= \mathbf{H}_{\pi(i)} \left(\sum_{m=1}^{r} b_{1m} \mathbf{w}_{1m} + \sum_{m=1}^{r} b_{2m} \mathbf{w}_{2m} + \cdots + \sum_{m=1}^{r} b_{Nm} \mathbf{w}_{Nm}\right) + \mathbf{n}_{\pi(i)} \quad \text{(EQ. 21b)} \\
&= \mathbf{H}_{\pi(i)} \left(\sum_{m=1}^{r} b_{\pi(i)m} \mathbf{w}_{\pi(i)m}\right) + \mathbf{H}_{\pi(i)} \left(\sum_{k=1}^{i-1} \sum_{m=1}^{r} b_{\pi(k)m} \mathbf{w}_{\pi(k)m}\right) + \mathbf{n}_{\pi(i)} \quad \text{(EQ. 21c)}
\end{aligned}$$

FIG. 8

$$y_{\pi(i)} = \begin{bmatrix} y_{\pi(i)1} \\ y_{\pi(i)2} \\ \vdots \\ y_{\pi(i)r} \end{bmatrix} = \begin{bmatrix} (\mathbf{h}_{\pi(i)1}\mathbf{w}_{\pi(i)1}) & (\mathbf{h}_{\pi(i)1}\mathbf{w}_{\pi(i)2}) & \cdots & (\mathbf{h}_{\pi(i)1}\mathbf{w}_{\pi(i)r}) \\ (\mathbf{h}_{\pi(i)2}\mathbf{w}_{\pi(i)1}) & (\mathbf{h}_{\pi(i)2}\mathbf{w}_{\pi(i)2}) & \cdots & (\mathbf{h}_{\pi(i)2}\mathbf{w}_{\pi(i)r}) \\ \vdots & \vdots & \cdots & \vdots \\ (\mathbf{h}_{\pi(i)r}\mathbf{w}_{\pi(i)1}) & (\mathbf{h}_{\pi(i)r}\mathbf{w}_{\pi(i)2}) & \cdots & (\mathbf{h}_{\pi(i)r}\mathbf{w}_{\pi(i)r}) \end{bmatrix} \begin{bmatrix} b_{\pi(i)1} \\ b_{\pi(i)2} \\ \vdots \\ b_{\pi(i)r} \end{bmatrix} + \begin{bmatrix} n_{\pi(i)1} \\ n_{\pi(i)2} \\ \vdots \\ n_{\pi(i)r} \end{bmatrix} \quad \text{(EQ. 22)}$$

$$\mathbf{y}_{\pi(i)} = \mathbf{G}_{\pi(i)}\mathbf{b}_{\pi(i)} + \mathbf{n}_{\pi(i)} \quad \text{(EQ. 23)}$$

$$(1+l_1)r_1 = r, \quad (1+l_2)r_2 = r, \ldots, (1+l_\kappa)r_\kappa = r,$$
$$(1-l_{\kappa+1})r_{\kappa+1} = r, \quad (1-l_{\kappa+2})r_{\kappa+2} = r, \ldots, (1-l_K)r_K = r \quad \text{(EQ. 24)}$$

FIG. 9

METHOD OF COORDINATED WIRELESS DOWNLINK TRANSMISSION

FIELD OF THE INVENTION

The present invention relates to communication systems and, more particularly, to methods of radio frequency communications in a wireless network.

BACKGROUND OF THE INVENTION

Wireless, radio frequency ("RF") communication systems enable people to communicate with one another over long distances without having to access landline-connected devices such as conventional telephones. In a typical cellular telecommunications network (e.g., mobile phone network), an area of land covered by the network is geographically divided into a number of cells or sectors, which are typically contiguous and which together define the coverage area of the network. Each cell is served by a base station, which includes one or more fixed/stationary transceivers and antennae for wireless communications with a set of distributed wireless units (e.g., mobile phones) that provide service to the network's end-user subscribers. The base stations are in turn connected (e.g., by way of an optical backhaul line) to a mobile switching center ("MSC") and/or radio network controller ("RNC"), which serve a particular number of base stations depending on network capacity and configuration. The MSC and RNC act as the interface between the wireless/radio end of the network and a public switched telephone network or other network(s) such as the Internet, including performing the signaling functions necessary to establish calls or other data transfer to and from the wireless units.

Various methods exist for carrying out RF communications between the base stations and wireless units. Examples include CDMA (code division multiple access), TDMA (time division multiple access), and OFDM (orthogonal frequency-division multiplexing). CDMA, widely implemented in wireless networks in the United States, is a spread-spectrum multiplexing scheme wherein transmissions from wireless units to base stations are across a single frequency bandwidth known as the reverse link, e.g., a 1.25 MHz (or greater) bandwidth centered at a first designated frequency. Generally, each wireless unit is allocated the entire bandwidth all of the time, with the signals from individual wireless units being differentiated from one another using an encoding scheme. Transmissions from base stations to wireless units are across a similar frequency bandwidth (e.g., a 1.25 MHz or greater bandwidth centered at a second designated frequency) known as the forward link. (The forward and reverse links are also known in the industry as the downlink and uplink, respectively.) In TDMA-based systems, which are widely used in Europe and elsewhere, frequency channels are divided into time slots for sharing among a plurality of users, such that the information for each user occupies a separate time slot of the frequency channel. In OFDM-based communications, the available RF bandwidth is divided into several sub-channels. The bit stream to be transmitted is split into a plurality of parallel, low-rate bit streams. Each bit stream is transmitted over one of the sub-channels by modulating a sub-carrier using a standard modulation scheme.

Regardless of its type, each wireless network has a government-assigned frequency spectrum for supporting RF communications between the wireless units and base stations. Because of this limited bandwidth, and because the demand on this bandwidth increases as the number of wireless users increases, it is desirable in a wireless system to use the available frequency spectrum in the most efficient manner possible. In particular, given a set bandwidth, greater efficiency generally corresponds to a greater network capacity in terms of the number of possible concurrent users and/or data throughput.

A major factor limiting RF efficiency and capacity in broadband wireless networks is intercell interference. Simply put, intercell interference is RF interference as seen in a particular network cell, which originates from transmissions in adjacent cells. Because cellular networks utilize a plurality of transmission sources (e.g., base stations), and because the transmission sources are typically spaced a relatively short distance apart, a wireless unit in a given cell will not only receive transmissions from the base station in its cell, but also transmissions from base stations in neighboring cells. The transmissions received from neighboring base stations are perceived as interference by the receiving wireless unit.

SUMMARY OF THE INVENTION

To reduce intercell interference, an embodiment of the present invention relates to a method of coherently coordinated downlink transmission in a wireless network. The network includes a plurality of interconnected, fixed base stations, each having one or more RF transmission antennas, and a plurality of wireless units. (By "wireless unit," it is meant mobile phones, wireless PDA's, computerized vehicle navigation systems, wireless devices with high-speed data transfer capabilities, such as those compliant with "3-G" or "4-G" standards, "WiFi"-equipped computer terminals, or the like.) In operation, the base stations transmit signals to the wireless units in a coherently coordinated manner (e.g., signal transmissions are coordinated among the base stations by transmitting data between the base stations for this purpose), for coherent, reinforced reception at the wireless units. In other words, transmissions from the base stations are coordinated such that the desired RF waves received at each wireless unit's particular location constructively add, but cancel out at other locations where they would otherwise constitute interference. The signals are generated based on a zero-forcing operation, e.g., by applying zero-forcing complex antenna weight vectors to data symbols designated for transmission to the wireless units. (In effect, the weight vectors for each wireless unit are selected to be orthogonal to the other wireless units' channels, thereby nulling interference.) For fairness, the signals are transmitted at no less than a specified rate which is common to all of the wireless units, e.g., a minimum rate or, equivalently, a guaranteed common rate.

In another embodiment, the specified rate (e.g., minimum rate or guaranteed common rate) is determined in view of at least one transmission power constraint of the base stations, e.g., a per-base station power constraint or a per-transmission antenna power constraint. For example, a convex optimization problem (which incorporates a linear power constraint) may be solved to maximize the specified rate. Signals may be transmitted to users at the same specified rate, or at different rates. Also, in regards to the specified rate, there may be one specified rate, or there may be different specified rates for different users, classes of users, transmission/data/QOS (quality of service) types, etc. Rates for different users, classes of users, etc. may be weighted multiples of the specified rate, e.g., multiples of a maximized minimum rate or maximized guaranteed common rate.

In another embodiment, dirty paper coding is used to generate the coherently coordinated transmission signals, for the cancellation of known interference. Zero-forcing operations are applied to reduce or eliminate any interference still present from the dirty paper coding.

In another embodiment, the base stations and wireless units each have a plurality of RF antennas for transmitting and receiving signals, respectively. Here, transmission signals are coordinated among the base stations with respect each base station antenna, i.e., each antenna is treated as a separate transmission source for coherently coordinated transmissions to the wireless units. If the wireless units have plural receive antennas, each base station may transmit a plurality of independent symbol streams simultaneously for each wireless unit, where the number of streams corresponds to the number of receive antennas. (It may be the case that the receiver has more antennas than the transmitter, in which case, more generally speaking, the number of symbol streams is less than or equal to the number of receive antennas.)

The signal-processing scheme for coherently coordinated transmissions may be summarized as including the following steps, according to another embodiment of the present invention. First, zero-forcing transmission subspaces are calculated for the base station transmission antennas. Eigen antennas are found based on the computer subspaces, and are mapped to the true antennas. Wireless unit rates/capacities and linear constraints (e.g., power constraints) are expressed as part of a convex optimization problem, which is solved for maximizing a minimum rate or guaranteed common rate and for the antenna transmission powers to achieve the guaranteed common transmission rate.

In another embodiment, prior to transmitting signals to the wireless units, the system discards a portion of the active wireless units in the network, for purposes of improving overall system performance. By "discard," it is meant that coherently coordinated signals are not transmitted to the wireless units so designated, at least temporarily, e.g., until channel conditions change. For illustrative purposes only, an example user loading level is, say, 90%, wherein 10% of active wireless units are assigned to an outage state. "Active" wireless unit refers to a wireless unit that is known to the network.

BRIEF DESCRIPTION OF THE DRAWINGS

The present invention will be better understood from reading the following description of non-limiting embodiments, with reference to the attached drawings, wherein below:

FIGS. 5-9 are equations used as part of the method of coordinated downlink transmission.

DETAILED DESCRIPTION

Figure 1:
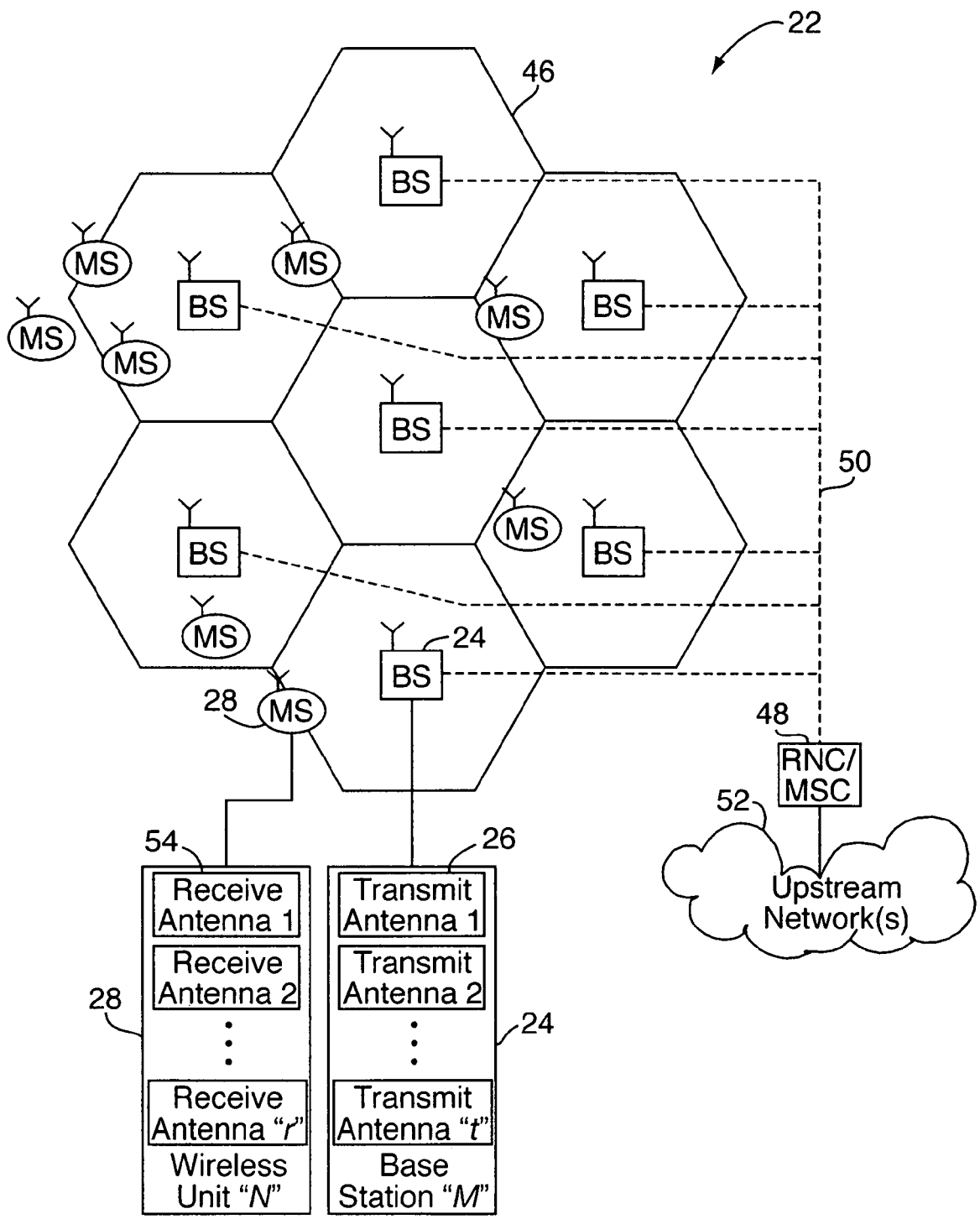
FIG. 1 is a schematic diagram of a wireless network.
Figure 2:
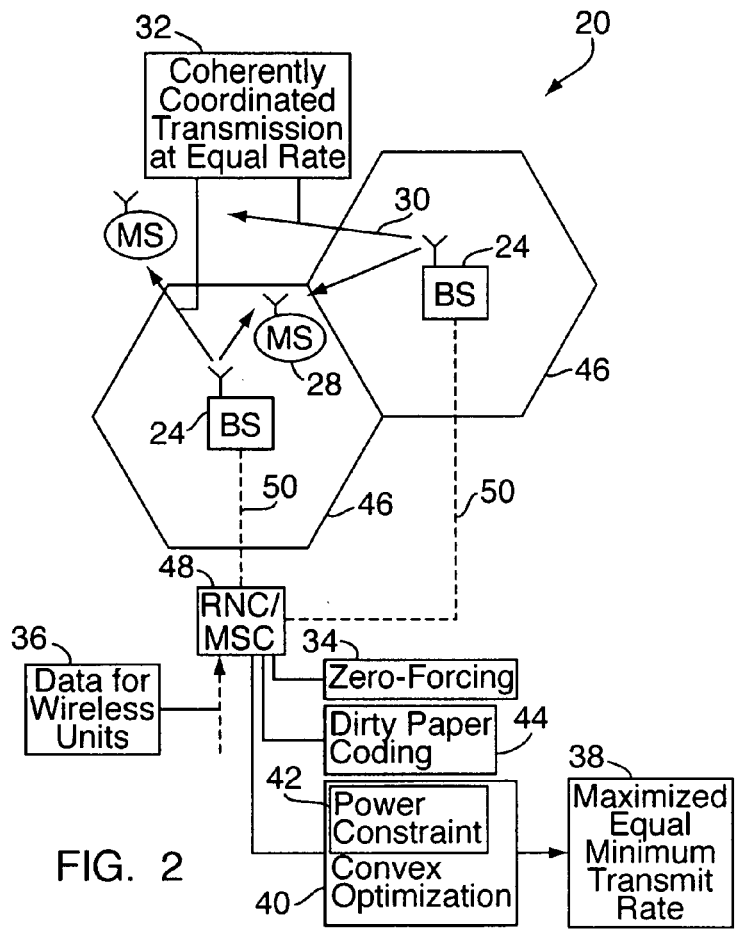
FIG. 2 is a schematic diagram showing portions of a wireless network implementing a method of coordinated downlink transmission according to a various embodiments of the present invention.

Turning to FIGS. 1 and 2 in overview, the present invention relates to a system and method 20 of coordinated downlink transmission in a wireless network 22. The network 22 includes a plurality of interconnected, fixed base stations ("BS") 24, each having one or more RF transmission antennas 26, and a plurality of wireless units or mobile stations ("MS") 28. ("Wireless unit" or "mobile station" refer to mobile phones, wireless PDA's, computerized vehicle navigation systems, wireless devices with high-speed data transfer capabilities, such as those compliant with "3-G" or "4-G" standards, "WiFi"-equipped computer terminals, or the like.) In operation, each base station 24 transmits signals 30 to each wireless unit 28 in a coherently coordinated manner 32 (e.g., signal transmissions are coordinated among the base stations by transmitting data between the base stations for this purpose), for coherent, reinforced reception at the wireless units 28. In other words, transmissions from the base stations are coordinated such that signals received at each wireless unit's particular location constructively add, but cancel out at other locations. (As should be appreciated, generally speaking, it is not necessary to be concerned with canceling out signals from base stations for those users not reached by those base stations.) The signals 30 are generated based on a zero-forcing operation 34, e.g., by applying zero-forcing complex antenna weight vectors to data symbols 36 designated for transmission to the wireless units. (In effect, the weight vectors for each wireless unit are selected to be orthogonal to the other wireless units' channels, thereby nulling or canceling interference.) For fairness, the signals are transmitted at no less than a specified rate 38 which is common to all of the wireless units, e.g., a minimum rate or, equivalently, a guaranteed common rate 38. A convex optimization problem 40 (which incorporates one or more linear power constraints or other linear constraints 42, e.g., a per-base station power constraint or a per-transmission antenna power constraint) is solved to maximize the specified rate (e.g., minimum rate). In another embodiment, dirty paper coding 44 is used in the process of preparing the coherently coordinated transmission signals, for the cancellation of known interference. Zero-forcing operations 34 are applied to reduce any interference otherwise present from the dirty paper coding.

The system 20 may be implemented in conjunction with any type of wireless network 22, such as a cellular telecommunications network. In a cellular network, as noted above, the network 22 is geographically divided into a number of cells or sectors 46, which are contiguous and which together define the coverage area of the network 22. (A commercial wireless network may include a greater number of cells than what is shown in FIG. 1—see, e.g., FIG. 4.) Each cell 46 is served by a base station 24, which includes one or more antennas 26 for wireless communications with the wireless units 28. ("Antenna" is used colloquially to refer to an RF transmission source generally, e.g., an RF transceiver and associated transducer for receiving/transmitting RF signals.) The base stations 24 are in turn connected to a mobile switching center ("MSC"), radio network controller ("RNC"), or other upstream network entity 48, by way of an optical backhaul network 50 or other high-speed line/network. The MSC and RNC are configured to function as the interface between the wireless/radio end of the network 22 and an upstream public switched telephone network or other network(s) 52. In a typical case, data 36 arrives at the MSC/RNC 48, which routes the data to one or more appropriate base stations 24 depending on the intended wireless unit recipients. Subsequently, the base station(s) processes the data for RF transmission to the recipient wireless unit(s).

As should be appreciated, coordinating transmissions among the base stations involves a significant degree of signal processing and mathematical computation. Computation/processing operations can be centralized or distributed: they can be carried out at the base stations, at the RNC/MSC, at other network locations, or a combination thereof. Typically, this will depend on the particular equipment configurations of the base stations and RNC/MSC and their corresponding processing capacities. It is assumed that the bandwidth of the backhaul network 50 is sufficient for the fast exchange of data between the base stations and/or RNC/MSC, for near real-time implementation of the method of coordinated downlink transmission.

The system and method 20 of coordinated downlink transmission in a wireless network 22 will now be explained in more detail as relating to how data is processed for coherently coordinated transmission. Computed numerical results for utilizing this method in an idealized network model are discussed below. The idealized network models discussed herein form the basis for the computed numerical results. However, the method/system 20 is directly applicable to "real life" networks, through a standard hardware/software implementation of the processes described herein.

Generally speaking, the method 20 involves interbase coordination in downlink signaling, for transmitting coherently coordinated signals from the base stations 24 to the wireless units 28. Each wireless unit receives signal power from all those base station antennas 26 that can gainfully cooperate in producing a coherently reinforced signal at the wireless unit's receive antenna(s) 54. This results in reduced intercell interference, increased spectral efficiency, and increased network capacity.

For coherently coordinated multiple base transmissions, either of two related methods of intercell cooperation may be used, according to alternative embodiments of the present invention. The first is equal rate, multiple base, coherently coordinated transmissions based on zero-forcing. Zero-forcing transmission serves each wireless unit in a way that does not cause interference to any other wireless unit. The second is equal rate, coherently coordinated transmission employing dirty paper coding ("DPC"). DPC involves canceling known interference, and is based on the recognition that the base stations are the collective source of signals to the wireless units. Because the base stations have knowledge of all the network signals, this enables some of the wireless units' signals to be encoded so that their interference is invisible to certain other users. In the method/system 20, DPC is combined with zero-forcing to remove all interference.

For purposes of simplified explanation herein, downlink transmissions to each wireless unit are assumed to be statistically independent, zero mean, Gaussian random processes that are temporally white. The spatial covariance for each wireless unit will be implicit in the explanation that follows.

For multiple base station coherent coordination, as indicated in FIG. 1, the network 22 is considered to have M base stations, each equipped with t transmit antennas, and N wireless units, each with r receive antennas 54. The base stations can all act together in coordination, and each wireless unit may receive signals from up to (t·M) base station antennas 26. Taking all the base station antennas 26 as input and all the wireless unit antennas 54 as output, the network 22 can be considered a multiple input multiple output (MIMO) network. The received signal model for the kth wireless unit can be written as follows:

$$y_k = H_k x + n_k \ k \in \{1, 2, \ldots, N\} \quad \text{(Equation 1)}$$

where $H_k=[h_{ij}]_{r \times tM}$ denotes the kth user's channel matrix, with $h_{ij}$ being the complex channel gain between ith receive antenna and jth transmit antenna, $x \in C^{tM \times 1}$ denotes the complex antenna outputs (without subscript k since it is composed of signals for all N wireless units), $y_k \in C^{r \times 1}$ is the received signal, and $n_k \in C^{r \times 1}$ denotes an additive white noise vector with covariance $\sigma^2 I_r$. To simplify the analysis, the vectors in Equation 1 above are redefined to be in normalized form, meaning that each vector has been divided by the standard deviation of an additive noise component, $\sigma$. In this case, the components of $n_k$ have unit variance. Also, the N vectors $\{n_k\}_{k=1}^N$ are i.i.d.

The fact that each wireless unit 28 has r receive antennas can be exploited in the spatial domain by transmitting up to r independent symbol streams simultaneously for each wireless unit. Moreover, since all base station antennas are coordinated, the complex antenna output vector x is composed of signals for all N wireless units. Therefore, x can be written as shown in Equation 2 in FIG. 5, where $b_{ij}$ denotes the jth symbol of wireless unit i, and $w_{ij}$ (see Equation 3) denotes the complex antenna weight vector that multiplies $b_{ij}$ before transmission. The selection of appropriate antenna weight vectors is discussed immediately below.

In regards to coherently coordinated transmissions based on zero-forcing, the following explanation relates to an optimum zero-forcing solution maximizing the specified rate 38 (e.g., minimum rate or, equivalently, guaranteed common rate 38) in a multiple antenna coordinated network subject to per base power constraints. For the zero-forcing transmission, the antenna weight vectors are selected such that each wireless unit's data symbols do not interfere with the other wireless units' data. However, a wireless unit's own data symbols can interfere with one another. Thus, the normalized zero-forcing weight vector satisfies Equation 4 in FIG. 5. In other words, each unit norm weight vector has to be orthogonal to the subspace spanned by other wireless units' channels. Note that each row of the channel matrix $H_k$ corresponds to the channel seen by one of the receive antennas of wireless unit k. Let the jth row of the matrix $H_k$ be denoted by $h_{kj}$. The weight vector $w_{kj}$ is obtained by projecting the channel vector $h_{kj}$ orthogonal to the subspace spanned by all the other wireless units' channels, which can be achieved using the pseudo inverse operation. First, the matrix A is defined as:

$$A = [h_{kj}; H_1; \ldots; H_{k-1}; H_{k+1}; \ldots; H_N],$$

and the corresponding pseudo inverse matrix is given by $A^\dagger(AA^\dagger)^{-1}$. Note that with left multiplication by A, the pseudo inverse matrix satisfies $AA^\dagger(AA^\dagger)^{-1}=I$. The first column of the pseudo inverse matrix, when its norm is normalized to unity, gives the antenna weight vector $w_{kj}$.

Given the constraint in Equation 4, and using Equation 2 (see FIG. 5), the system model in Equation 1 above can be written as indicated by Equations 5-7 in FIG. 5. These equations effectively define a single wireless unit r×r MIMO channel with Gaussian noise. To show this, Equations 5-7 in FIG. 5 are rewritten as Equation 8 in FIG. 6. The matrix in Equation 8 can be written in short form as:

$$y_k = G_k b_k + n_k \quad \text{(Equation 9)}$$

where $b_k=[b_{k1}, b_{k2}, \ldots, b_{kr}]^T$ denotes the symbol vector, and $G_k=[g_{ij}]$r×r denotes the resulting MIMO channel, with $g_{ij}$ being the effective channel gain between ith receive antenna and jth transmitted symbol.

For each user, the rate achievable as a function of powers of the data symbols can be determined as follows. Using the singular value decomposition theorem, the effective channel matrix $G_k$ is rewritten as:

$$G_k = U_k D_k V_k^\dagger \quad \text{(Equation 10)}$$

where $U_k \in C^{r \times r}$ and $V_k \in C^{r \times r}$ are unitary, and $D_k \in C^{r \times r}$ is a diagonal matrix with the non-negative square roots of the eigenvalues of the matrix $G_k G_k^\dagger$ on the diagonals. Denote each diagonal by $\lambda_{kj}^{1/2}$ for $j=1, \ldots, r$. Equation 10 above transforms the effective MIMO system model (Equation 9) into the form of a set of parallel Gaussian channels as shown in Equation 11 in FIG. 6. It follows that the rate achievable in the parallel Gaussian channels (Equation 11), and in its equivalent MIMO channel (Equation 9), is given by Equation 12 in FIG. 6. Note that each base station has its own transmit power constraint, and since wireless unit rates are expressed in terms of power allocations using eigenvector coordinates, a mapping is required between $E[|b_{kj}|^2]$, powers of data symbols $E[|b_{kj}|^2]=P_{kj}$, and actual antenna transmit powers. Using the equality in Equation 13, the notation in Equation 14, and the fact that data symbols are independent, results in Equation 15.

Given the antenna weight vector $w_{kj}$ shown in Equation 16 in FIG. 7, the symbol $b_{kj}$ with power $P_{kj}$ contributes a total amount of power to the transmit power at antenna q, as indicated in Equation 17. The total transmit power at antenna q is the sum of the contributions of the symbols of all wireless units, as shown in Equation 18.

Now that it has been described how to calculate the achievable rates, and the individual power constraints at each base antenna, the formal problem statement is set forth in Equations 19a-19d in FIG. 7. The objective is to maximize the guaranteed common rate $r_0$ (or equivalently to maximize the minimum rate in the network) subject to per base (or per antenna) power constraints. Note that $r_0$ is the guaranteed common rate, and it can also be interpreted as the minimum rate to be maximized, as set forth in Equation 20. Also, notice that the constraint in Equation 19c defines a per antenna power constraint. However, other types of power constraints can easily be included in the optimization problem set forth in Equations 19a-19d. For example, for the case of a constraint on the total base power, the contributions of the base stations (given on the left side of the inequality in Equation 19c) are summed together, and the sum is constrained. The problem set forth in Equations 19a-19d is a convex optimization problem. This is because the constraints in Equations 19c are linear, and because the constraints in Equation 19b define a convex region. The logarithm function is concave in the power assignment matrices, and the sum of concave functions is also concave. Each constraint in Equation 19b defines a region underneath a concave function and above the hyperplane defined by $r_0$, which is also a convex set. This is because the intersection of convex sets is another convex set. Therefore, standard convex optimization techniques can be used to solve the problem.

Figure 3:
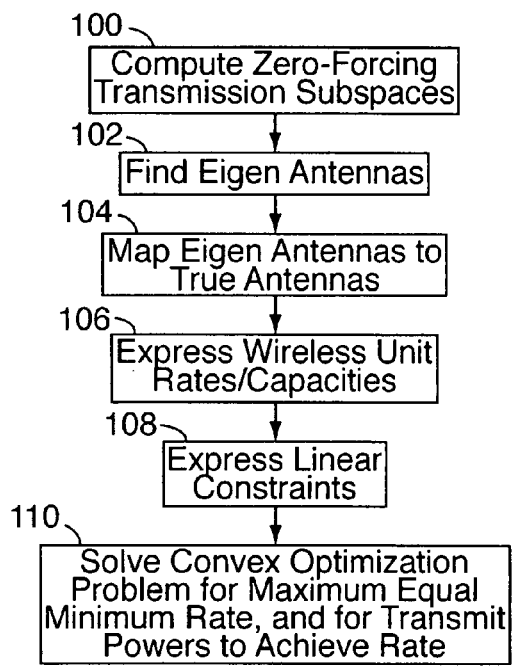
FIG. 3 is a flow chart showing a method of equal rate zero-forcing coherently coordinated transmission according to an embodiment of the present invention.

FIG. 3 summarizes the signal-processing scheme for coherently coordinated transmissions using zero-forcing, for the case of multiple antennas. At Step 100, zero-forcing transmission subspaces are calculated for the base station transmission antennas. At Step 102, Eigen antennas are found based on the computer subspaces, and are mapped to the true antennas at Step 104. Wireless unit rates/capacities and linear constraints (e.g., power constraints) are expressed at Steps 106, 108 as part of a convex optimization problem, which is solved at Step 110 for maximizing a specified rate at or above which signals are transmitted to the wireless units (e.g., a guaranteed common transmission rate or, equivalently, a minimum rate), and for the antenna transmission powers to achieve the specified rate.

As noted above, performance may be improved by discarding a portion of the active wireless units in the network, prior to transmissions. For example, a 90% maximum user loading level is assumed, e.g., 10% of active wireless units are assigned to the outage state due to relatively undesirable circumstances for serving them. To achieve a 90% user loading level, a 100% loading of the entire network is assumed. The first wireless unit to be discarded is the wireless unit that caused the power constraint (Equation 19c) to go active first, and therefore would prevent the guaranteed common rate to be increased further. Within the remaining set of wireless units, the next wireless unit to cause the power constraint to go active is discarded. This process is repeated until 10% of active wireless units are discarded.

As should be appreciated, the aforementioned user loading process may or may not be applicable to actual use in a network, or it may only be applicable at certain times or if certain conditions are met, depending on the particular network configuration and communication protocols in place in the network. For example, it may be the case that wireless units are discarded only during times of heavy network access. Also, in a working system, some users assigned to outage in one "frequency band" (e.g., time, code, and/or frequency division) could be served successfully in another band. In any event, a less than 100% user loading level is beneficial for computational network analysis, as discussed further below.

In addition to operations based on zero-forcing 34, it is possible to use DPC (dirty paper coding) 44 for canceling known interference. A modified form of zero-forcing is utilized to remove interference that the DPC does not remove. In the zero-forcing approach discussed above, each wireless unit's interference is nulled out by selecting weight vectors orthogonal to the other wireless units' channels. In the DPC approach, when the interference is known causally at the transmitter, N wireless units' codewords can be chosen such that given a user order $[\pi(1), \ldots, \pi(N)]$, a wireless unit with index $\pi(i)$ does not suffer any interference from wireless units with lower indexes, e.g., $\pi(k)$ with $k<i$. When DPC is combined with the limited form of zero-forcing, the interference still present from DPC will be nulled out due to the zero-forcing weight vectors. In this case, the weight vectors for wireless unit $\pi(i)$'s data symbols have to be orthogonal to the channels of wireless units $\pi(k)$ with $k<i$ only. Thus, the zero-forcing weight vectors have to satisfy the conditions set forth in Equation 21 in FIG. 8.

The weight vectors satisfying the conditions in Equation 21 can be found using the pseudo inverse operation. First, a matrix A is defined as in Equation 22. The corresponding pseudo inverse operation is given by $A^\dagger(AA^\dagger)^{-1}$. The first column of the pseudo inverse matrix, when its norm is normalized to unity, gives the antenna weight vector $w_{\pi(i)j}$. Given the zero-forcing constraint in Equation 21, and using Equation 2, the system model (Equation 1) for wireless unit $\pi(i)$ can be written as Equations 21a-21c in FIG. 8.

The terms inside the second parenthesis in Equation 21c represent the interference that will be canceled out by DPC. Therefore, the received signal after both zero-forcing and DPC can be written as Equation 22 in FIG. 9. Equation 22 effectively defines a single wireless unit r×r MIMO channel with Gaussian noise. Similar to as discussed above, the above matrix equation is written in a short form as Equation 23 in FIG. 9. Given Equation 23, the calculation of the achievable rates and the power constraints at each base follow the same steps as discussed above. Similarly, the problem statement is the same as in Equations 19a-19d. Note that the coefficients used in Equation 19b have to be updated based on the singular value decomposition of the effective channel matrix $G_{\pi(i)}$ in Equation 23, and the new weight vector coefficients have to be used in Equation 19c. It should be noted that r×r is used as an example. Extension to r*×r** with r* not equal to r** examples are also possible.

For ordering wireless units and determining the 10% discard, assume that the 10% discard has taken place. A heuristic ordering of wireless units for the zero-forcing part of the method is devised. For the first wireless unit, all candidates are surveyed. The one with the smallest single user log det capacity with all base antennas serving the wireless unit (channel vector norm in a 1-transmit antenna, 1-receive antenna case) is designated as user "ZF-1." The ZF-1 wireless unit is granted preferred treatment, and all the other wireless units must communicate using transmit vectors projected away from wireless unit ZF-1's channel vectors. In the subspace spanned by the remaining wireless units, the process is repeated to find the second weakest candidate wireless unit (e.g., the candidate with the smallest log det capacity when the channel vectors are projected orthogonal to ZF-1), which is designated as wireless unit "ZF-2." This proceeds iteratively until all wireless units are ordered. The heuristic reasoning behind the placement of the weakest wireless unit at each step is that the weakest wireless unit will only get weaker if placed later in the list. Regarding the 10% wireless unit discard, the first step of the above heuristic is employed repeatedly to find mock ZF-1 wireless units. Each time one is found, it instead becomes a dropped wireless unit. This continues until the required quota of 10% dropped wireless units is found. Then the remaining wireless units are ordered as discussed above.

Computed numerical results were run based on the idealized models discussed above, to illustrate the performance advantages of the system 20 over non-coordinated transmission methods such as full power, single base station transmissions.

Figure 4:
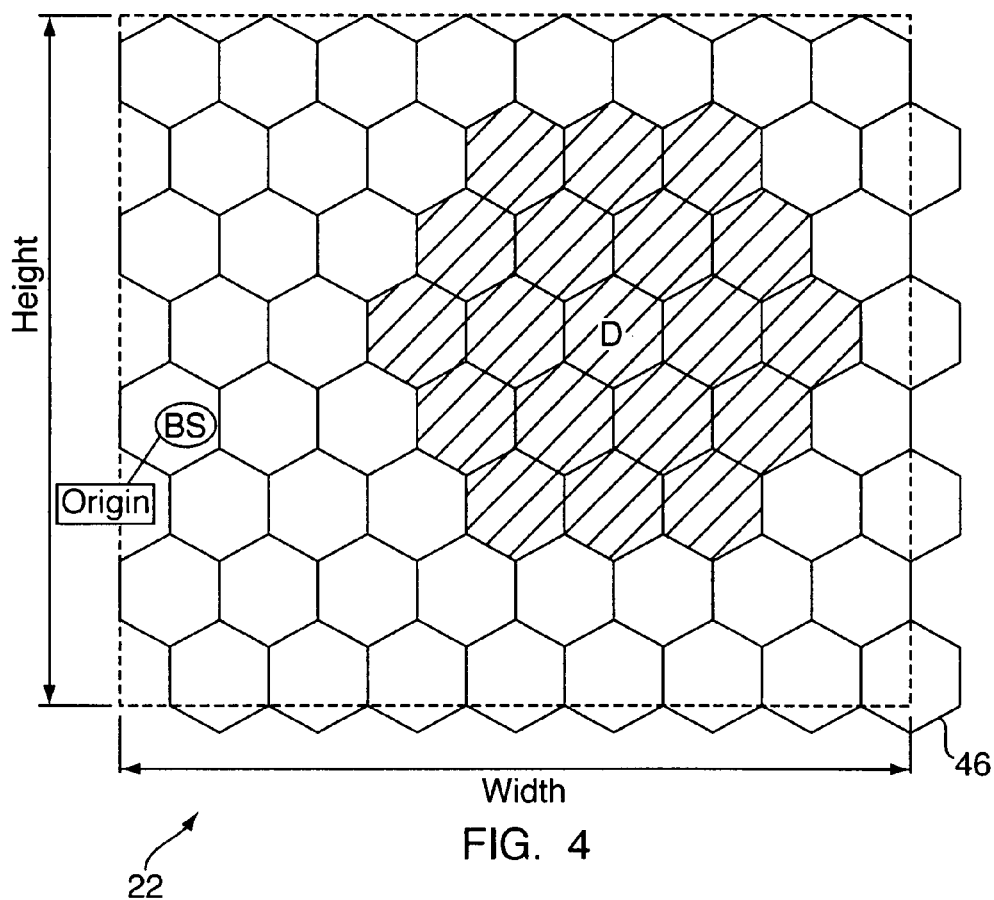
FIG. 4 is a graphical representation of a wireless network divided into hexagonal cells.

For the computed numerical results, regarding base station arrangement, an idealized network 22 is divided into hexagonal cells 46 that are regularly arranged to tile a flat torus, so as to avoid complications and distortions due to boundary cells. FIG. 1 shows a 7-cell array of hexagonal regions each with a base at the center. As a further, more general example, FIG. 4 shows a 64-cell, 8-by-8 array of hexagonal regions. The flat torus is formed out of a flat rectangle that contains the origin, and that is regularly paved with hexagons. The opposite sides of the rectangle are identified to compose the torus. The distance between points on the flat torus is defined as the length of the shortest straight-line path.

Regarding the idealized wireless propagation model used for computation, the base antenna to wireless unit antenna propagation characteristic is a triple product. Besides a path loss component decaying with distance with an exponent of 3.8, there are two random components. One random component is log normal shadow fading with a mean of zero and a standard deviation of 8 dB, and the other is a Rayleigh fading component, which is a complex zero mean Gaussian random variable of unit variance. The Rayleigh fading characteristics (from base station antennas to wireless units) are statistically independent, as are the shadow fading realizations. Furthermore, the Rayleigh and shadow characteristics are statistically independent of each other.

In FIG. 4, given a designated base station "D," only the first two concentric hexagonal rings of neighboring base stations are not shadowed by the earth. This propagation feature is idealized by assuming that the power decay with distance (which is taken to have an exponent of 3.8) holds out to a distance of twice the closest distance between base stations. At greater distances, propagation strength is assumed to be zero. This leads to the representation of a 19-cell neighborhood, as indicated by the shaded cells in FIG. 4.

Continuing with the model idealizations, the antennas 26, 28 are assumed to be omni-directional. Each base station 24 is assumed to have a maximum available transmission power of 10 watts. A mean power loss of 134 dB is assumed at the reference distance, which is taken to be one mile from the base station. The three way corner where hexagons meet is one mile from the three closest bases. Other assumptions include a receiver noise figure of 5 dB, a vertical antenna gain of 10.3 dBi, a channel bandwidth of 5 MHz, and a receiver temperature of 300° K. Thus, accounting only for path loss and ignoring shadowing and Raleigh fading, the interference free signal-to-noise ratio at the reference distance is 18 dB.

For the numerical results, the network is considered loaded with wireless units to the level of one per base station. However, 10% of the wireless units will be assigned to the outage state due to relatively undesirable circumstances for serving them, as discussed above. (10% discard refers to 10% within roundoff, e.g., 6 wireless units in the outage state in a 64 base network.) The heavy (90%) loading that is investigated is only meant to be a hypothetical high resource contention context, for probing the relative merit of competing means of operating networks. The initial state is a 100% loading of the entire network. Subsequently, wireless units are randomly, uniformly, and independently placed on the flat torus. One after another, each of the wireless units is associated with the base station with the strongest signal. If the corresponding base station has already been associated with a previous wireless unit, the unserved wireless unit is considered as being referred to another sub-band than the one currently focused on for possible service. This placement of wireless unit continues until all base stations have been paired with a wireless unit.

Subsequently, 10% of the wireless units are discarded according to a specified procedure. Often, it will not be suitable to just dismiss 10% of the wireless units on the basis of weakest propagation from their serving base station. Suppose wireless units were eliminated in this way. The motivation for allowing 10% outage is to mitigate dragging down the performance of the served wireless units under the constraint of serving these wireless units with a guaranteed common rate/minimum rate. However, this method of discard has the shortcoming in that it does not address the clumping of strongly coupled wireless units in space. Such clumping would be bound to occur in large networks. Consequently, mutual interference between non-discarded wireless units could develop that would drag the guaranteed rate down to zero in the limit of large networks.

This degeneracy is avoided by using wireless unit elimination techniques for the various communication methods that depend not only on the strength of the direct path to the wireless unit, but also on the interference caused by coupling from other wireless units. The 10% elimination here is done in an iterative manner that is individually naturally tailored to each communication method. Even so, this may be less than optimal (as is the case with other discard methods), as being too computationally intensive for a procedure to effectively explore each candidate 10% wireless unit subset for dismissal. Whenever the issue of optimality of an algorithm associated with a transmission technique is discussed, it is meant optimality apart from the suboptimal dismissal of wireless units. The details of the discard methods used are as discussed above.

The computed numerical results quantify network spectral efficiency in terms of throughput measured at 10% outage. For equal-rate systems, network efficiency is defined as the total network throughput in bits per symbol (summed over wireless units) divided by the total number of base stations in the network. For other transmission methods, illustrated for comparison purposes, throughput is measured in much the same way as an equal rate system by using the minimum rate in a network. Even though the main value of interest is the guaranteed common rate for the served wireless units, the probability distribution function ("PDF") of the entire ensemble of variable rates in the comparison transmission methods (e.g., single base station transmissions) is also discussed.

For all four methods of downlink transmission illustrated in the numerical results, five hundred independent instantiations of a 64 base station network were evaluated. In each case, equal rate methods (e.g., zero-forcing and DPC) were compared against the baseline case of a full power, single base station transmission. The numbers presented in this section are throughputs per network base station for 10% outages, which is the same as the 0.0% PDF value for the rate ensemble of the 90% of wireless units that were served. All throughputs cited herein are in units of bits/cycle/user/network base. "Per network base" includes all network base stations, not just the subset of active network base stations. Specifically, for single base station methods, not all bases are necessarily active, but all bases can be active for coordinated schemes. Strictly speaking, for coherently coordinated systems the (K, K) notation, e.g., (# transmit antennas per base, # receive antennas per wireless unit), represents a slight abuse of notation. More precisely, when K is equal to 4, the entire network involves (256, 232) representing 64 base stations acting in concert and 58 users, both base stations and users with four antennas each.

The numerical examples also include the results of a technique to improve throughput PDF's under the guaranteed common rate constraint. The main idea of this technique is that each network instantiation may correspond to a subnet that is part of a network composed of many like subnets (for example, in a broadband network with narrowband sub-networks), each of which operates distinct from the others, and the random variable of subnet rates for an equal rate system may not be a constant. This is because there is rate equality within the subnets, but not necessarily among distinct subnets. One can transform the rate random variable to a constant while maximizing the 10% outage value by simply having the higher rate subnets give up bandwidth to the lower rate subnets until a constant rate among subnets is achieved.

Figure 10:
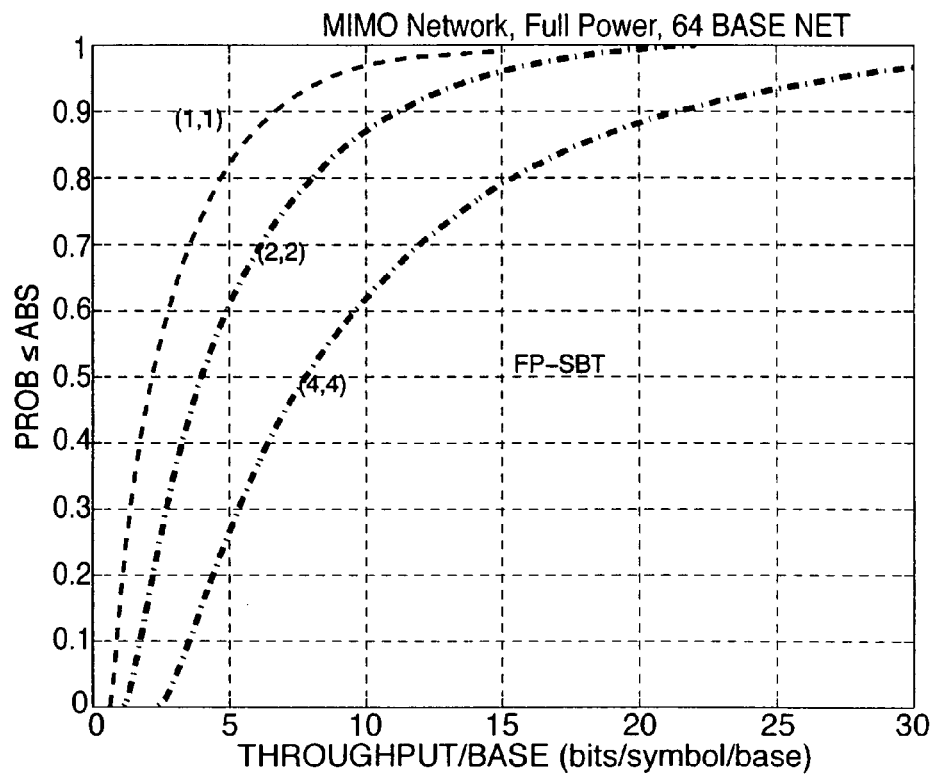

FIGS. 10-13 show the PDF's (probability distribution functions) of the served wireless units, according to the numerical calculations with parameters as set forth above. Note that the dotted vertical line PDF's include adjustments of the bandwidths to create a universal equal rate solution according to Equation Set 24 discussed below. The other curves are for the 10% outage per network instantiation requirement. Also note, a per base station power constraint is assumed in all calculations. With reference to FIG. 10, the baseline (full power, single base station transmission—"FP-SBT") 0% outage value is 0.62 for the (1,1) system, 0.97 for the (2,2) system, and 1.97 for the (4,4) system. (Again, "(x, y)" refers to ("x" transmit antennas per base, "y" receive antennas per wireless unit).

Figure 11:
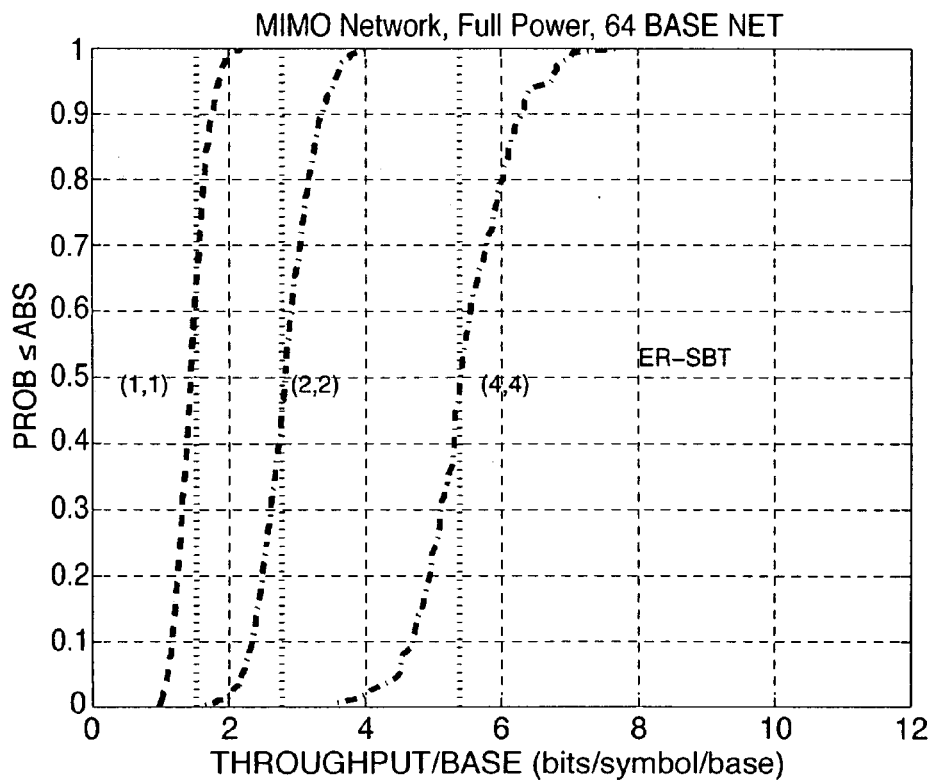

As shown in FIG. 11, for equal rate, single base station transmission ("ER-SBT") schemes, which is another baseline transmission approach, when 10% discard is applied to each network instantiation, the 0% tile is 1.17 for the (1,1) system, 1.66 for the (2,2) system, and 3.59 for the (4,4) system. From the dotted curve, is can bee seen that in a broadband network with narrowband sub-networks, one can improve performance further by giving more or less bandwidth as needed to meet a guaranteed target rate which is maximized here at a common rate of 1.68 for the (1,1) system, 2.78 for the (2,2) system, and 5.39 for the (4,4) system.

Figure 12:
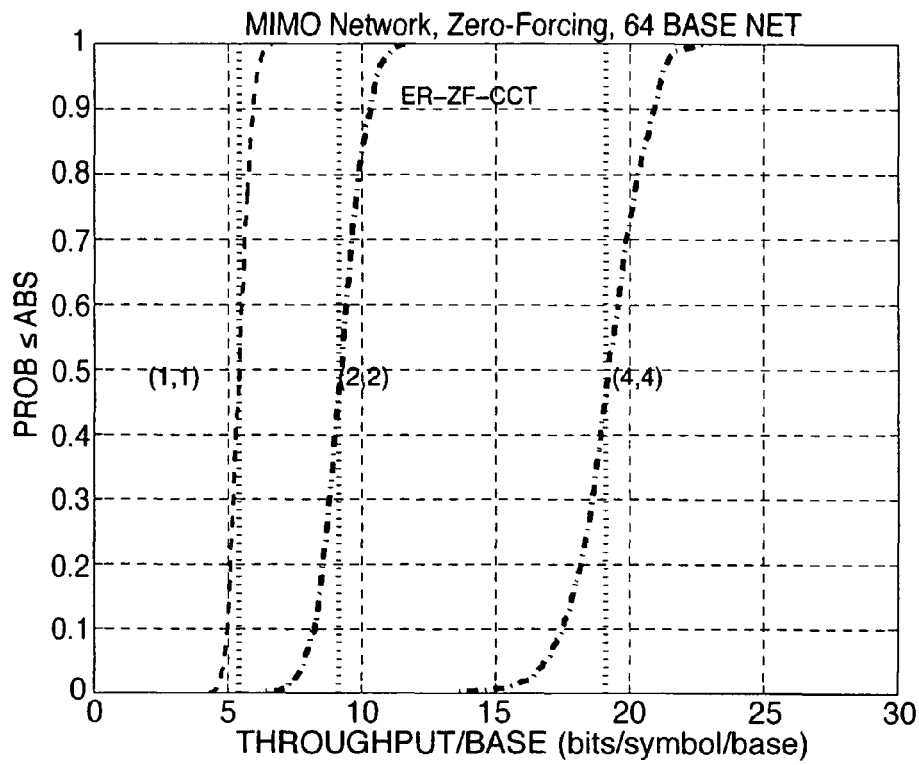
Figure 13:
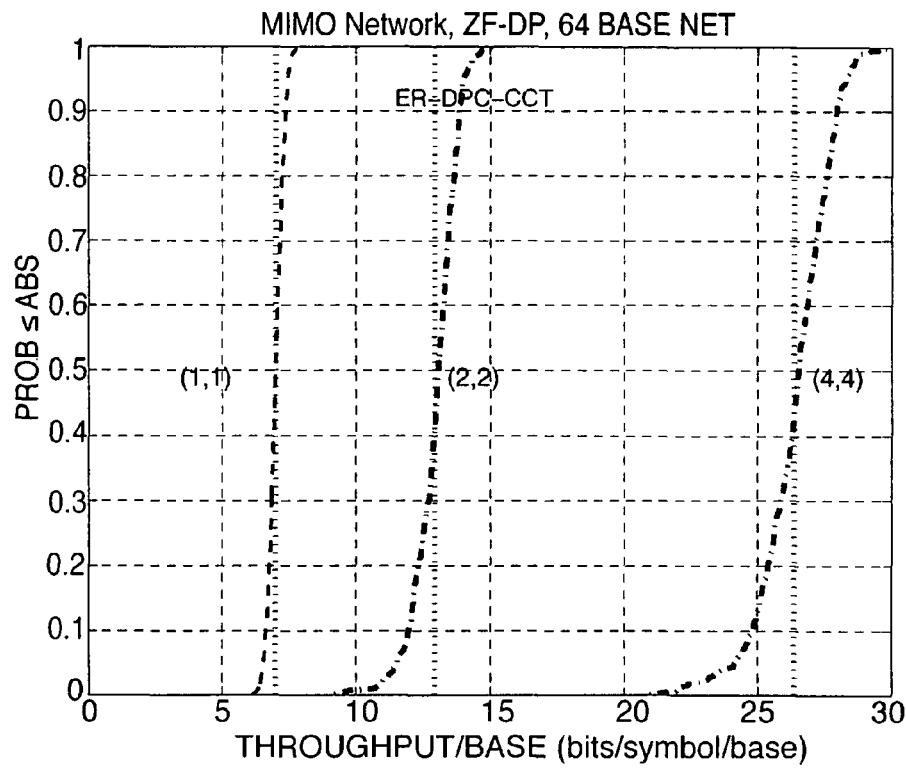

For equal rate, zero-forcing, coherently coordinated ("ER-ZF-CCT") schemes, as shown in FIG. 12, when 10% discard is applied to each network instantiation, the 0% tile is 4.28 for the (1,1) system, 6.43 for the (2,2) system, and 13.64 for the (4,4) system. In the case of bandwidth adjustment in a broadband network, a common rate of 5.40 is achieved for the (1,1) system, 9.16 for the (2,2) system, and 19.08 for the (4,4) system.

Figure 14:
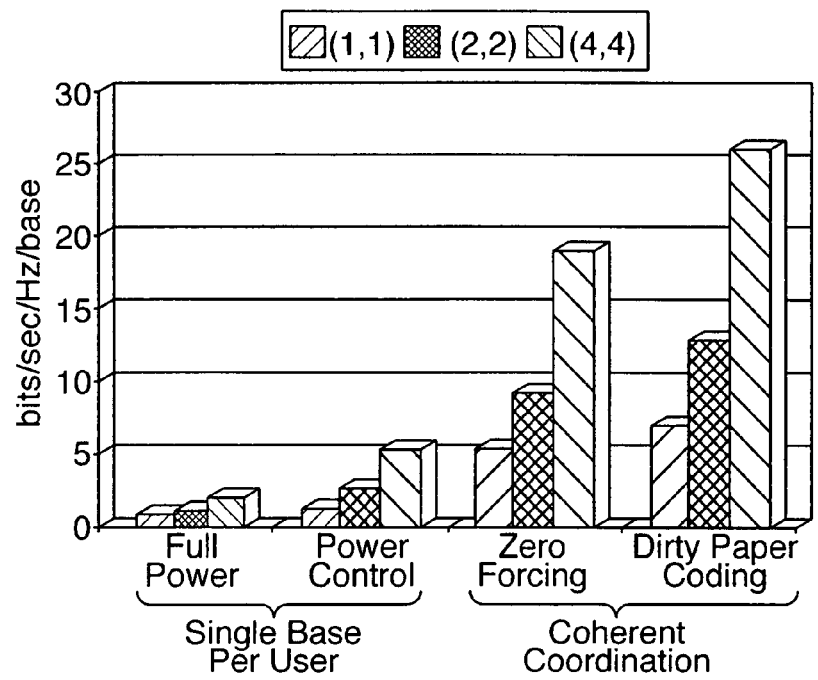
FIGS. 10-14 are graphs showing calculated numerical results of a mathematically modeled network utilizing the method of coordinated downlink transmission, in comparison to baseline methods such as single base station transmission.

For equal rate, DPC, coherently coordinated ("ER-DPC-CCT") schemes, as shown in FIG. 12, when 10% discard is applied to each network instantiation, the 0% tile is 6.14 for the (1,1) system, 9.22 for the (2,2) system, and 20.96 for the (4,4) system. In the case of bandwidth adjustment in a broadband network, a common rate of 7.00 is achieved for the (1,1) system, 12.93 for the (2,2) system, and 26.34 for the (4,4) system. Using the bandwidth adjustment values in equal rate schemes, a summary of the results is given in FIG. 14. Enormous improvement over the baseline is quantified due to both coherent coordination and multiple antennas.

It is possible to improve network throughput PDF's under the equal minimum rate constraint. To do so, each network instantiation is considered to possibly correspond to a subnet that is part of a network composed of many like subnets (for example, in a broadband network with narrowband sub-networks), each of which operates distinct from the others, and the random variable of subnet rates for an equal rate system may not be a constant. This is because there is rate equality within the subnets, but not necessarily among distinct subnets. One can transform the rate random variable to a constant while maximizing the 10% outage value by simply having the higher rate subnets give up bandwidth to the lower rate subnets until a constant rate among subnets is achieved.

To make this conversion, let $r_1 < r_2 < r_3 < \ldots < r_K$ be the list of all K subnet rates in increasing order. Then let $l_1, l_2, \ldots, l_K$ denote the positive adjustments necessary to convert the respective $r_k$, k=1, 2, ..., K to a common rate r according to Equation Set 24 in FIG. 9. Here, the positive $l_1, l_2, \ldots, l_K, \ldots, l_K$, the κ value where the sign change occurs on the left hand side, and the maximum common rate, r=r*, all need to be determined. This is a simple calculation if one tries each candidate κ to locate that sign transition yielding the maximum value of r=r*. The solution is easily seen to be:

$$r^* = K \times (r_1^{-1} + r_2^{-1} + \ldots + r_K^{-1})^{-1}.$$

By using coordinated phase coherent signaling from multiple base stations to eliminate intercell interference, according to the method 20 described above (specifically, equal rate, zero-forcing coherently coordinated transmission and equal rate, DPC coherently coordinated transmission), it is possible to achieve enormous efficiencies. In particular, despite the 18 dB SNR, and allowing for fading and interference, for full power, single base transmissions (i.e., the baseline or standard transmission approach), the common rate for a 90% served population is only 0.62 bits/symbol/network base. While this 0.62 improves to 2.0 with four transmission antennas per base and four receive antennas per wireless unit (e.g., (4,4)), this can hardly be called an enormous efficiency. The obstacle is the crush of intercell interference. After all, it is SINR (signal to interference-plus-noise ratio) that is important in a heavy fading environment in a cellular network, not SNR. This state of affairs holds with single base station transmissions even when power control is employed, although the (4,4) rate increases to 3.6. For (4,4) systems utilizing the method 20, on the other hand, the values obtained were 13.5 for zero-forcing and 21 for DPC. In a broadband network these numbers refer to one of the sub-bands. If one balances bandwidths to maximize the minimum sub-band efficiencies, the results are 19 for zero-forcing coherently coordinated transmission and 26.5 for DPC coherently coordinated transmission. Such efficiencies are significant.

As noted above, signals may be transmitted to users at the same rate, or at different rates. For example, there may be a guaranteed common rate or minimum rate 38, with signals being transmitted to all users at the guaranteed common rate. (If network conditions permit, it may be the case that signals are transmitted above the minimum rate/guaranteed common rate.) Also, rates for different users, classes of users, etc. may be weighted multiples of a maximized minimum rate/guaranteed common rate. For example, one user (or group or class of users) has a specified transmission rate R (e.g., the guaranteed common rate 38), another has $Q\_1 \cdot R$, another $Q\_2 \cdot R$, etc., where "$Q\_i$" are positive numbers and R is maximized.

Since certain changes may be made in the above-described method of coordinated wireless downlink transmission, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method of communicating with a plurality of wireless units in a wireless network, said method comprising:
    for each wireless unit, generating coherently coordinated signals based at least in part on a zero-forcing operation; and
    transmitting the coherently coordinated signals from a plurality of base stations to the wireless unit at no less than a specified rate which is common to all wireless units of said plurality.

2. The method of claim 1 wherein the specified rate is determined in view of at least one transmission power constraint.

3. The method of claim 2 wherein, for each base station:
    the base station includes a plurality of transmit antennas; and
    the at least one power constraint comprises a selected one of: a transmit power of each of said plurality of transmit antennas being no greater than a designated maximum per-antenna transmit power; and a total transmit power of the base station being no greater than a designated maximum total transmit power.

4. The method of claim 2 further comprising:
    maximizing the specified rate according to a convex optimization, said convex optimization incorporating the at least one transmission power constraint.

5. The method of claim 4 wherein, for each base station:
    the base station includes a plurality of transmission antennas; and
    the at least one power constraint comprises a selected one of: a transmit power of each of said plurality of transmission antennas being no greater than a designated maximum per-antenna transmit power; and a total transmit power of the base station being no greater than a designated maximum total transmit power.

6. The method of claim 1 wherein the coherently coordinated signals are generated by applying zero-forcing complex antenna weight vectors to data symbols designated for transmission to said wireless units.

7. The method of claim 6 further comprising:
    transmitting, from the base stations, a plurality of independent symbol streams simultaneously for each wireless unit, wherein the number of said plurality of independent symbol streams for each wireless unit is no greater than a number of receive antennas of the wireless unit.

8. The method of claim 6 wherein the coherently coordinated signals are generated based on a dirty paper coding operation in addition to said zero-forcing operation, said zero-forcing complex antenna weight vectors reducing any interference otherwise present from the dirty paper coding.

9. The method of claim 1 wherein the coherently coordinated signals are transmitted to the wireless units at different rates, said different rates being weighted multiples of the specified rate.

10. The method of claim 1 further comprising:
    prior to said generation and transmission steps, discarding a designated portion of a total number of active wireless units in the network, wherein the remaining, non-discarded wireless units comprise said plurality of wireless units to which coherently coordinated signals are transmitted.

11. The method of claim 1 wherein the coherently coordinated signals are generated based on a dirty paper coding operation in addition to said zero-forcing operation, said zero-forcing operation reducing any interference otherwise present from the dirty paper coding.

12. The method of claim 1, wherein the zero-forcing operation comprises:
    computing a plurality of zero-forming transmission subspaces;
    finding a plurality of Eigen antennas based at least in part on said subspaces; and
    mapping said Eigen antennas to transmission antennas of the base stations.

13. A method of communicating in a network, between a plurality of base stations and a plurality of wireless units, said method comprising:
    generating coherently coordinated signals based on a zero-forcing operation; and
    transmitting the signals from the base stations to the wireless units at no less than a specified rate, said rate being common to all wireless units of said plurality;
    wherein the signals are coordinated among the base stations for coherently reinforced reception by the wireless units, whereby intercell interference in the network is reduced.

14. The method of claim 13 wherein the specified rate is maximized using a convex optimization having at least one power constraint, said power constraint comprising at least one of: a designated maximum base station transmission power; and a designated maximum transmit antenna transmission power.

15. The method of claim 13 wherein the zero-forcing operation comprises applying zero-forcing complex antenna weight vectors to data symbols designated for transmission to said wireless units.

16. The method of claim 13 wherein the signals are generated based on a dirty paper coding operation in addition to said zero-forcing operation, said zero-forcing operation reducing any interference otherwise present from the dirty paper coding.

17. The method of claim 13 further comprising:
    prior to said generation and transmission steps, discarding a designated portion of a total number of active wireless units in the network, wherein the remaining, non-discarded wireless units comprise said plurality of wireless units to which the signals are transmitted.

18. The method of claim 13 wherein the zero-forcing operation comprises:
   computing a plurality of zero-forming transmission subspaces;
   finding a plurality of Eigen antennas based at least in part on said subspaces; and
   mapping said Eigen antennas to transmission antennas of the base stations.

19. A method of coordinated communications in a wireless network, said method comprising:
   discarding a designated portion of a first plurality of active wireless units in the network, wherein the remaining, non-discarded wireless units comprise a second plurality of wireless units that is less than said first plurality of active wireless units;
   generating coherently coordinated signals based on a zero-forcing operation; and
   transmitting the signals from the base stations to the second plurality of wireless units at a guaranteed common rate, wherein the signals are coordinated among the base stations for coherently reinforced reception by the second plurality of wireless units.

20. The method of claim 19 wherein the guaranteed common rate is maximized according to a convex optimization problem having at least one transmission power constraint, said convex optimization problem being based at least in part on the application of zero-forcing complex antenna weight vectors to data symbols designated for transmission to said second plurality of wireless units.

* * * * *